Figure 1:
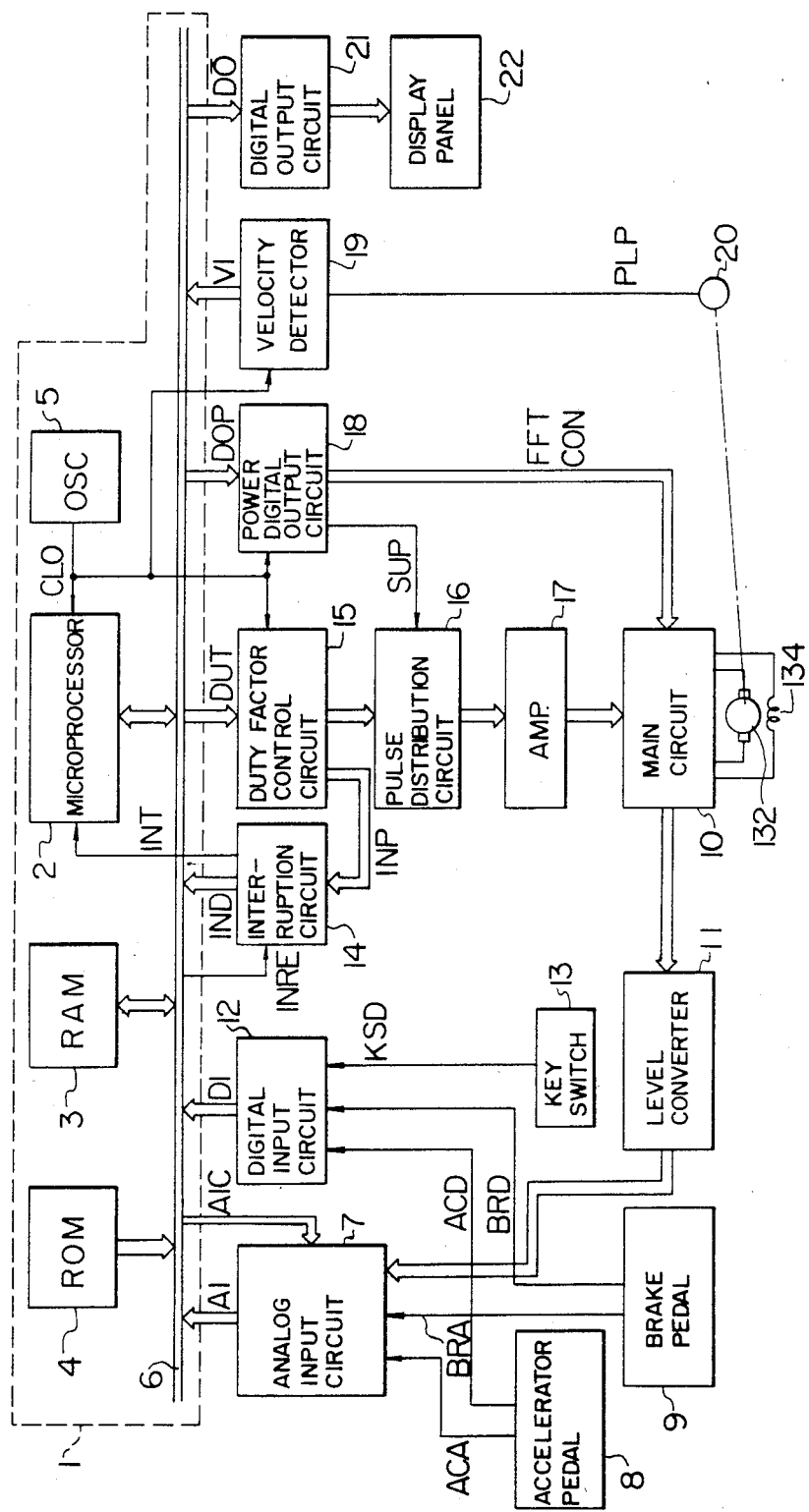

United States Patent [19]

Omae et al.

[11] Patent Number: 4,580,083
[45] Date of Patent: Apr. 1, 1986

[54] CHOPPER CONTROLLER FOR A D.C. MOTOR

[75] Inventors: Tsutomu Omae; Katsuji Marumoto, both of Hitachi; Shotaro Naito, Katsuta, all of Japan

[73] Assignee: Hitachi, Ltd., Tokyo, Japan

[21] Appl. No.: 652,169

[22] Filed: Sep. 19, 1984

Related U.S. Application Data

[63] Continuation of Ser. No. 581,666, Feb. 21, 1984, which is a continuation of Ser. No. 252,598, Apr. 9, 1981, abandoned.

[30] Foreign Application Priority Data

Apr. 11, 1980 [JP]  Japan .................................. 55-46882
Apr. 11, 1980 [JP]  Japan .................................. 55-46883

[51] Int. Cl.[4] ............................................. H02P 5/16
[52] U.S. Cl. .................................. 318/338; 318/139; 318/257; 318/274; 318/345 E
[58] Field of Search ............ 318/139, 377, 338, 345 C, 318/345 B, 345 A, 345 E, 397, 399, 341, 274, 317, 257

[56] References Cited

U.S. PATENT DOCUMENTS

| | | | |
|---|---|---|---|
| 3,950,684 | 4/1976 | Peterson | 318/338 |
| 4,153,863 | 5/1979 | Schachte et al. | 318/341 |
| 4,189,667 | 2/1980 | Boxer | 318/338 |
| 4,216,417 | 8/1980 | Anderson et al. | 318/345 E X |
| 4,284,932 | 8/1981 | Kawada et al. | 318/338 |
| 4,366,420 | 12/1982 | Omae et al. | 318/338 |
| 4,500,820 | 2/1985 | Noto et al. | 318/139 |

OTHER PUBLICATIONS

A. K. Lin et al, "A Microprocessor Speed Control System", IECI '77 Proceedings Industrial Electronics and Control Instrumentation, Mar. 21-23, 1977, pp. 144-151.

B. K. Bose et al, "A Microcomputer Based Real Time Feedback Controller for an Electric Vehicle Drive System", IAS '79:25F, 1999, 25F, pp. 743-748.

Primary Examiner—William M. Shoop, Jr.
Assistant Examiner—Shik Luen Paul Ip
Attorney, Agent, or Firm—Antonelli, Terry & Wands

[57] ABSTRACT

A chopper controller for a D.C. motor controls currents flowing in an armature winding and a field winding of the D.C. motor by controlling an armature chopper and a field chopper in accordance with a command from a command generator such as an accelerator pedal. The armature chopper and the field chopper are controlled by chopper control signals from an armature chopper control circuit and a field chopper control circuit, respectively. Those chopper control signals are in a predetermined phase relationship and an interruption request signal is issued in phase-synchronism with one of the chopper control signals. In response to the interruption request signal, computing means computes an armature chopper duty factor and a field chopper duty factor in accordance with the command from the command generator and supplies them to the chopper control circuits.

22 Claims, 16 Drawing Figures

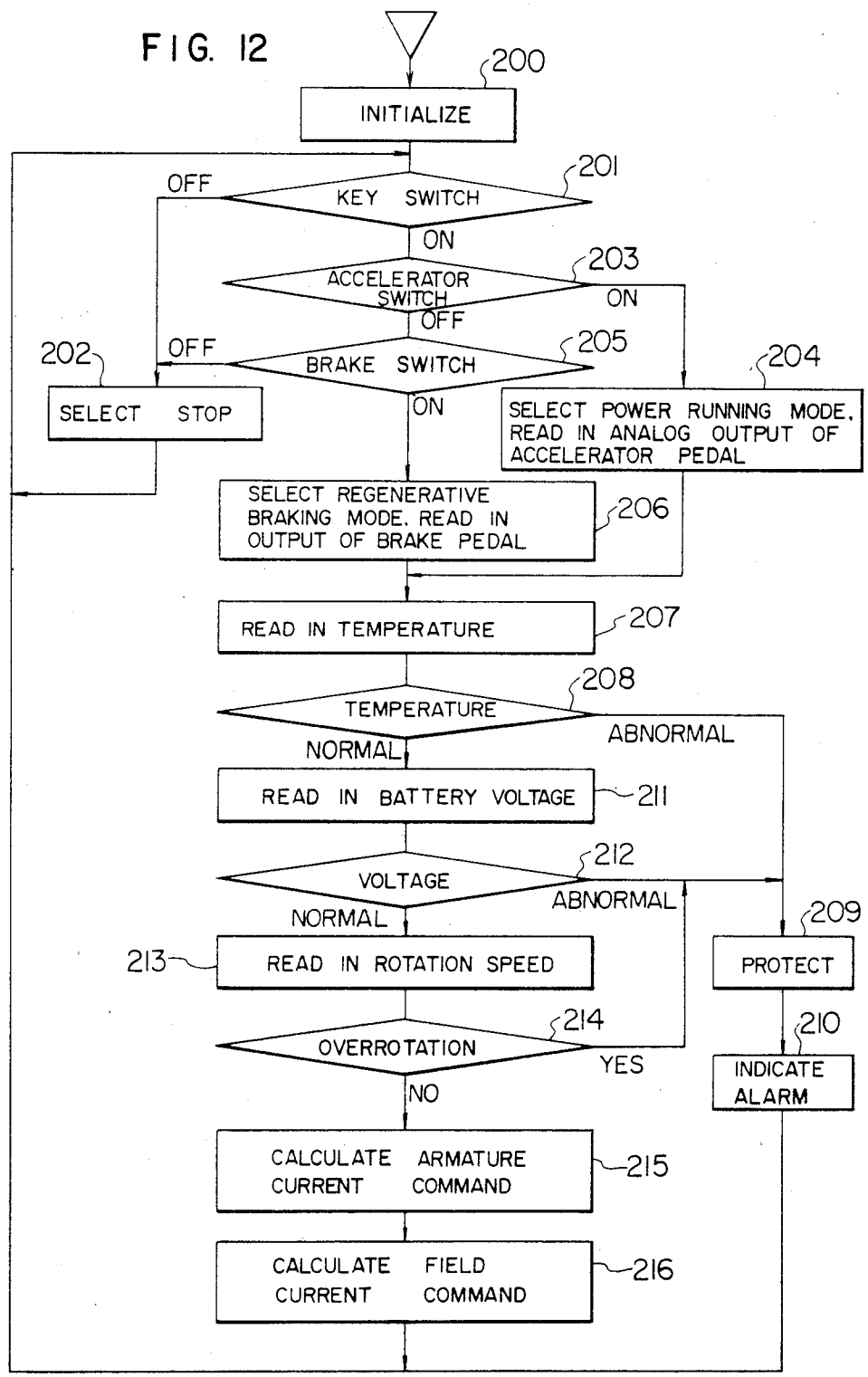

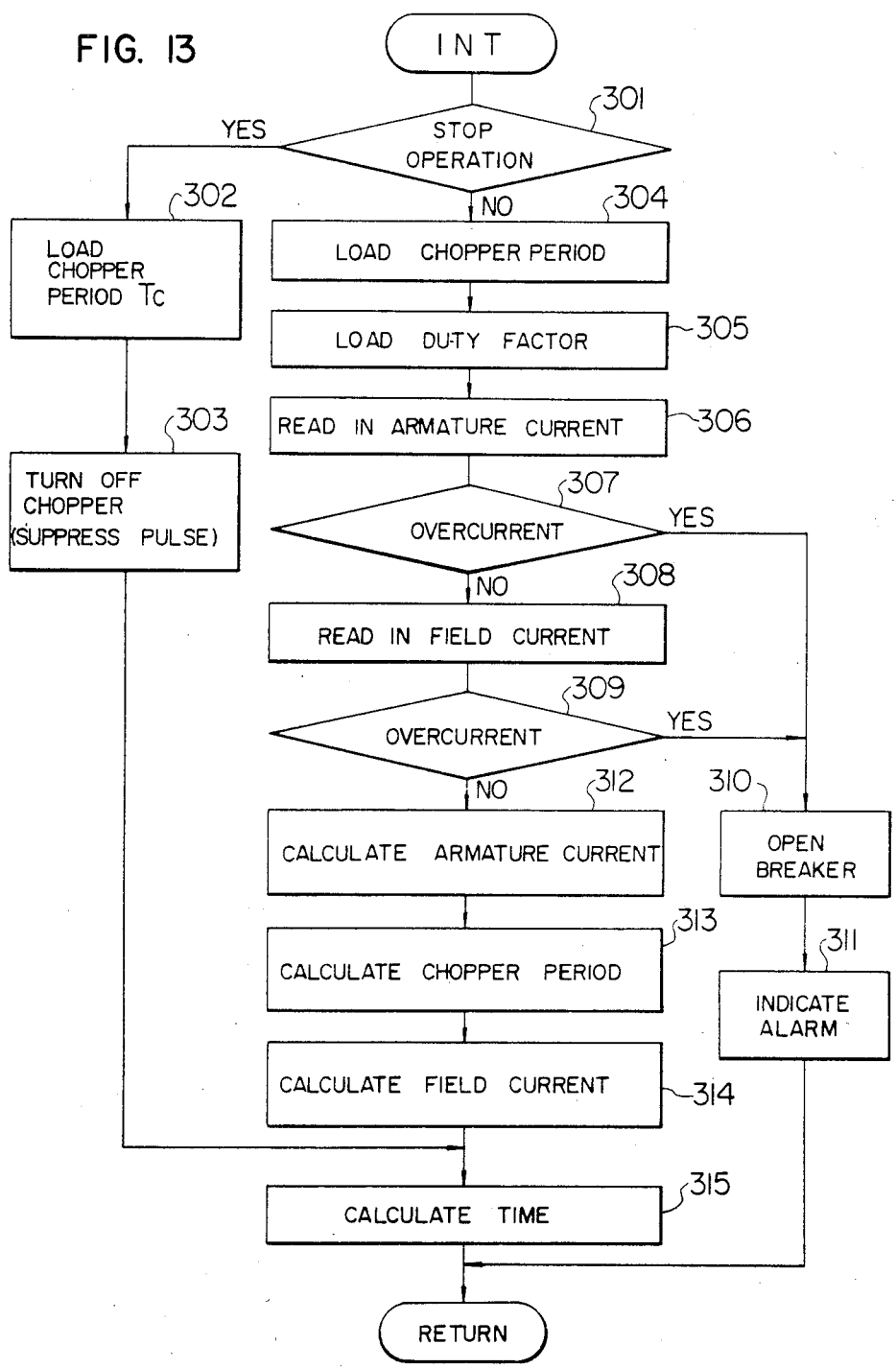

CHOPPER CONTROLLER FOR A D.C. MOTOR

This application is a continuation of application Ser. No. 581,666, filed Feb. 21, 1984, which is a continuation of application Ser. No. 252,598, filed Apr. 9, 1981, now abandoned.

The present invention relates to a chopper controller for a D.C. motor, and more particularly to a controller having a microcomputer which is suitable for use in an electric vehicle.

One example of a shunt motor being controlled by a chopper circuit is shown in U.S. Pat. No. 4,216,417. The chopper circuit comprising two chopper circuits, an armature chopper circuit and a field chopper circuit, is usually used as taught by an article "A Microcomputer Based Real Time Feedback Controller for An Electric Vehicle Drive System", IAS, 1979, 25F, pp 743-748 and an article "A Microprocessor Speed Control system" IECI, Mar. 21-23, 1977. Usually, a period of the armature chopper circuit is changed depending on a duty factor of the chopper in order to keep the pulsation of an armature current at a constant level. On the other hand, the field chopper circuit is controlled at a fixed period because an inductance of a field winding is large and hence the pulsation of the current is small.

When those two choppers are to be controlled by a microcomputer in accordance with a prior art, interruption pulses of a predetermined period for controlling the armature chopper circuit and interruption pulses of a predetermined period for controlling the field chopper circuit are prepared and interruption processing programs which are independent from each other are used to control the process. In such a system, the interruption processing programs are complex. In addition, since the interruption pulses are generated at a faster rate than the chopping rate, a large portion of processing time of the microcomputer is occupied by the interruption program processing and a small portion of the processing time is allotted for the other processing.

The prior art chopper control method includes a chopper turn-on synchronous method in which the conductions of the armature chopper and the field chopper start simultaneously and an asynchronous method in which the conductions of both choppers may start freely. In both methods, it may happen that both choppers are turned off simultaneously. In such a case, since overvoltages generated when the choppers are turned off are superimposed, chopper elements having high breakdown voltage must be used.

It is an object of the present invention to provide a chopper controller for a D.C. motor in which interruption signals are generated in synchronism with the armature chopper circuit or the field chopper circuit in order to simplify the interruption processing of the microcomputer.

It is another object of the present invention to provide a chopper controller for a D.C. motor in which the armature chopper and the field chopper are operated with a predetermined phase difference therebetween to prevent the superposition of surge voltages generated when the armature chopper and the field chopper are turned off so as to allow the use of low breakdown voltage elements in the chopper circuits.

In accordance with the present invention, there is provided a chopper controller for a D.C. motor which comprises computing means for computing duty factors of the armature chopper and the field chopper based on control amounts from an instruction unit, an armature chopper control circuit and a field chopper control circuit for generating chopper controlling signals for controlling the armature chopper and the field chopper in accordance with the duty factors computed by the computing means, and an interruption signal generating circuit for generating an interruption signal in synchronism with one of the chopper controlling signals to interrupt the execution of a program by the computing means.

Figure 2:
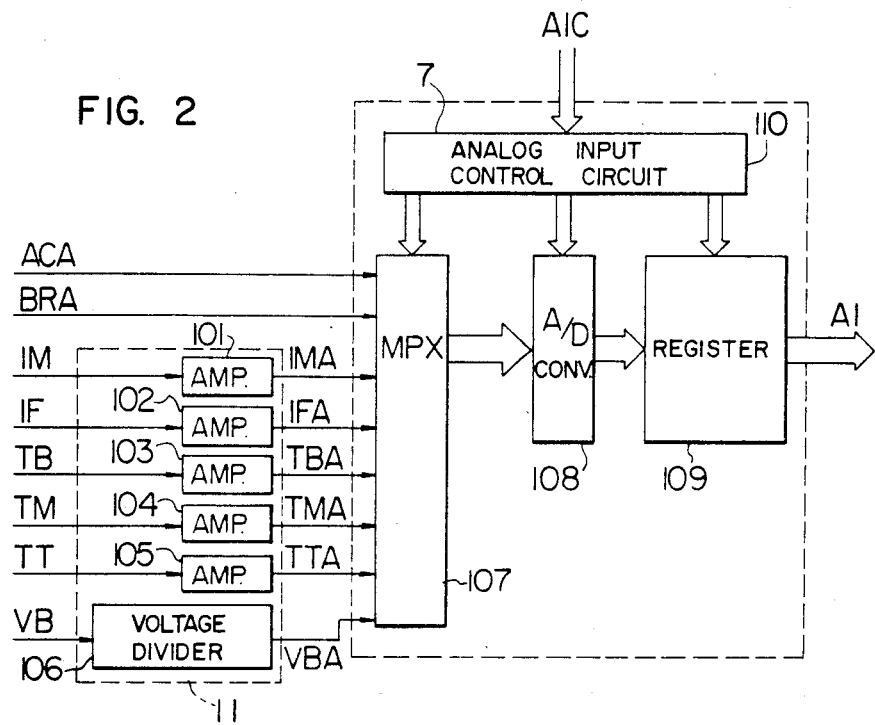
Figure 3:
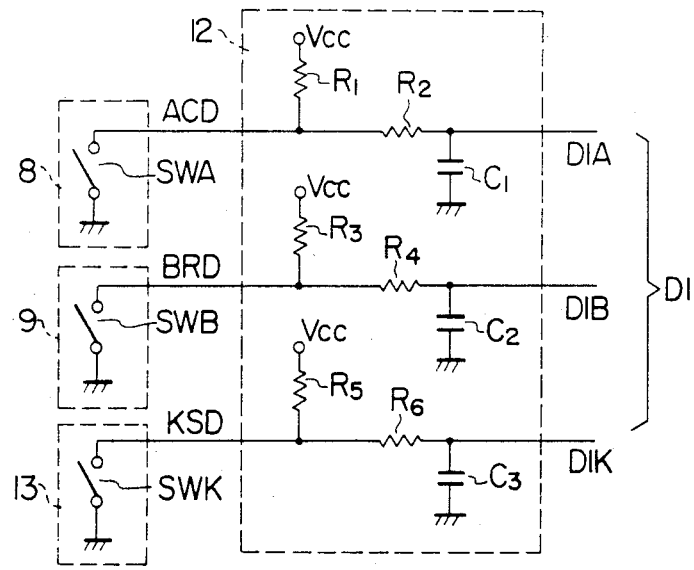
Figure 4:
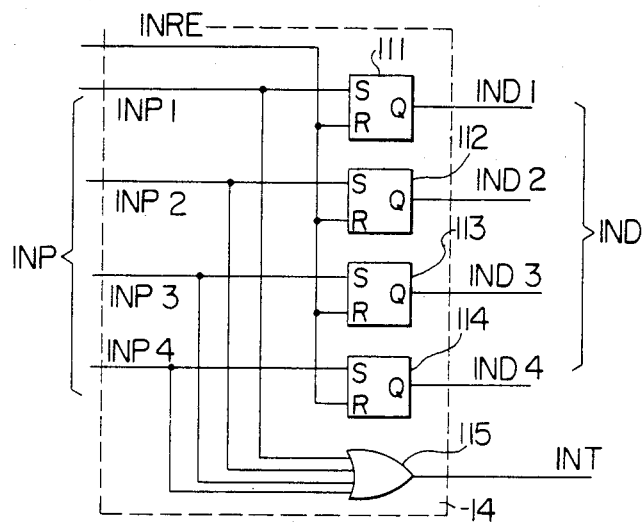
Figure 6:
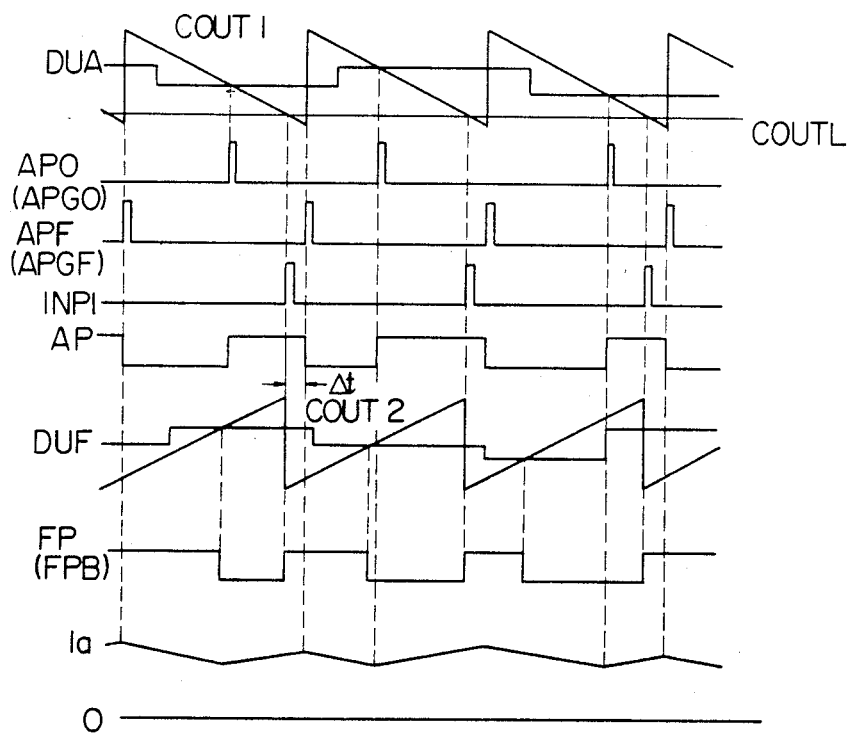
Figure 5:
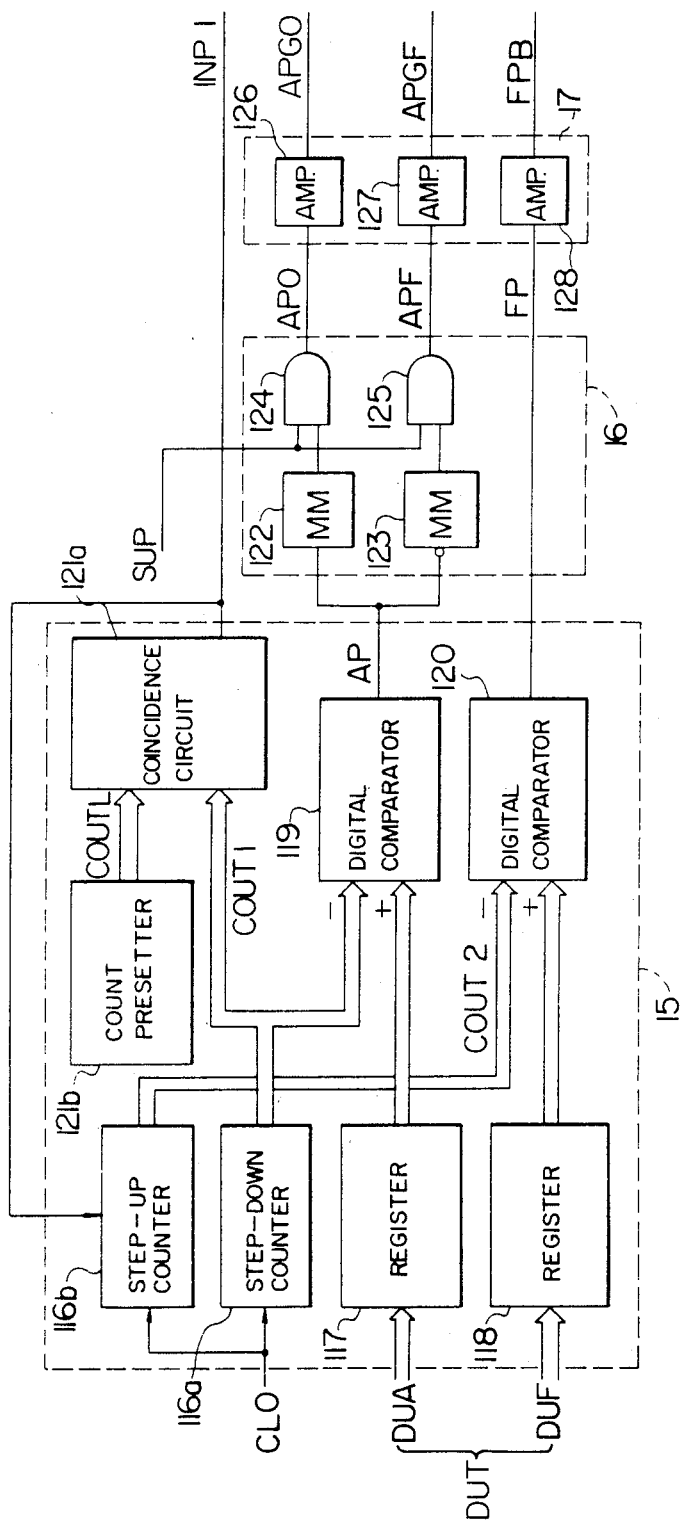
Figure 7:
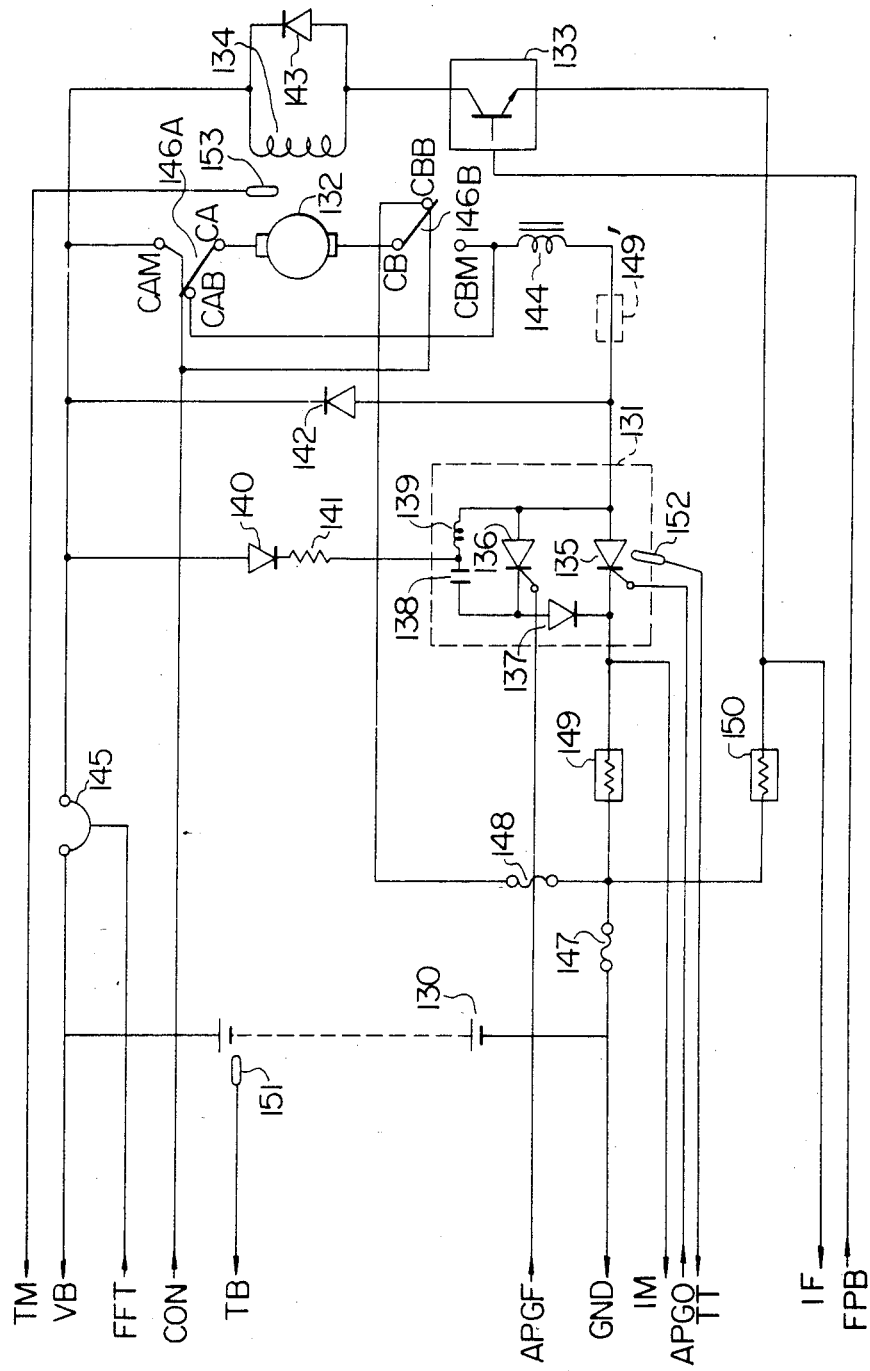
Figure 8:
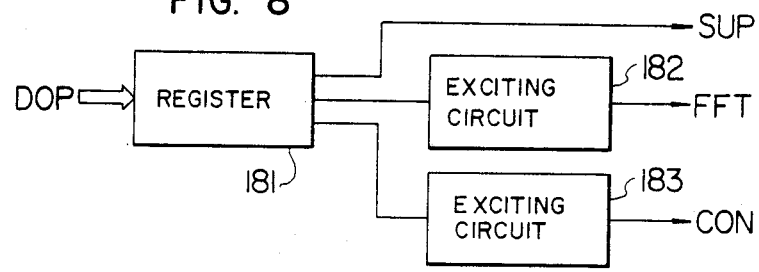
Figure 9:
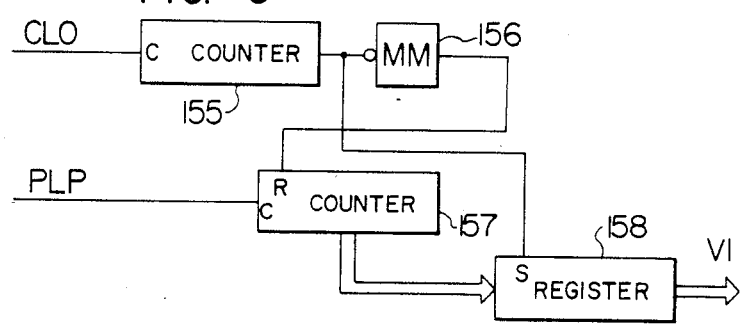
Figure 11A:
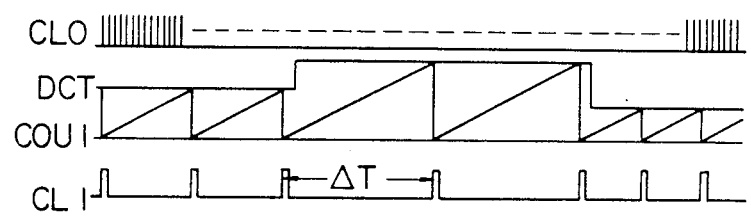
Figure 11B:
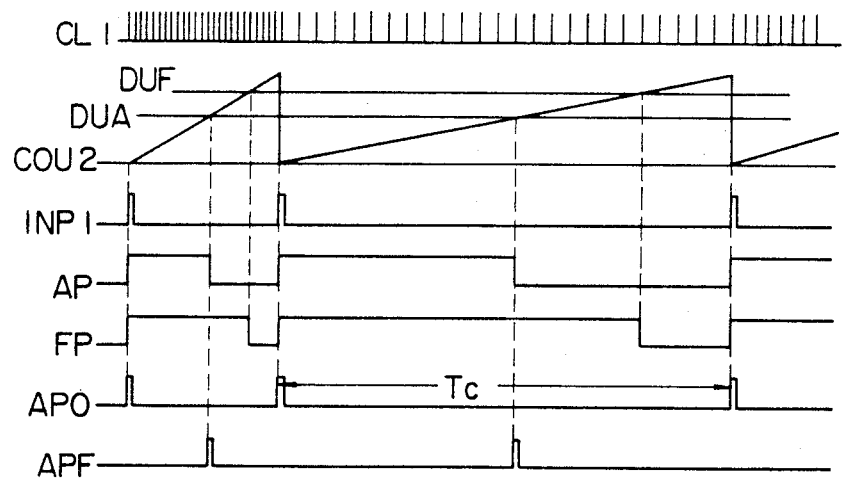
Figure 10:
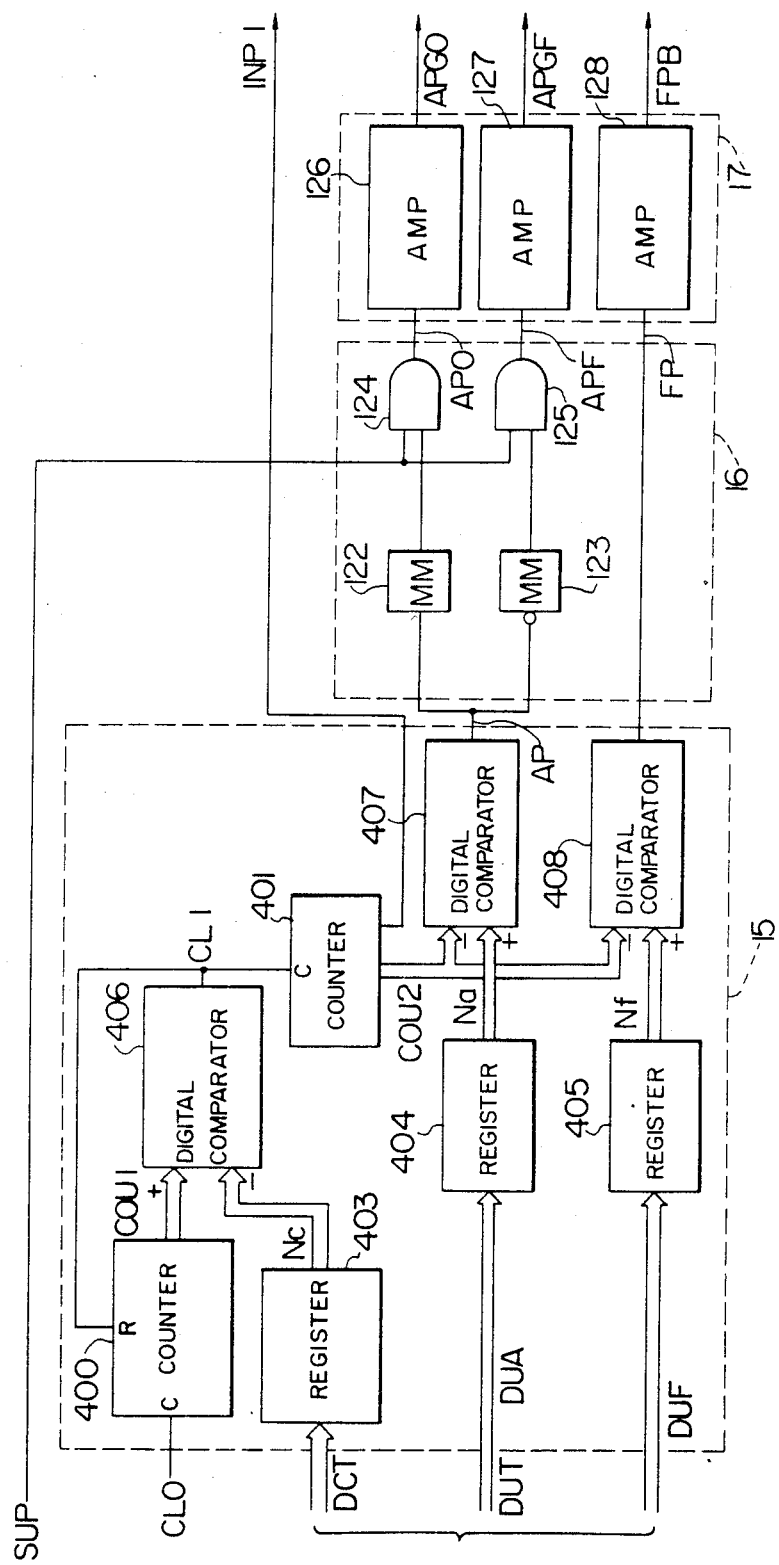
Figure 14:
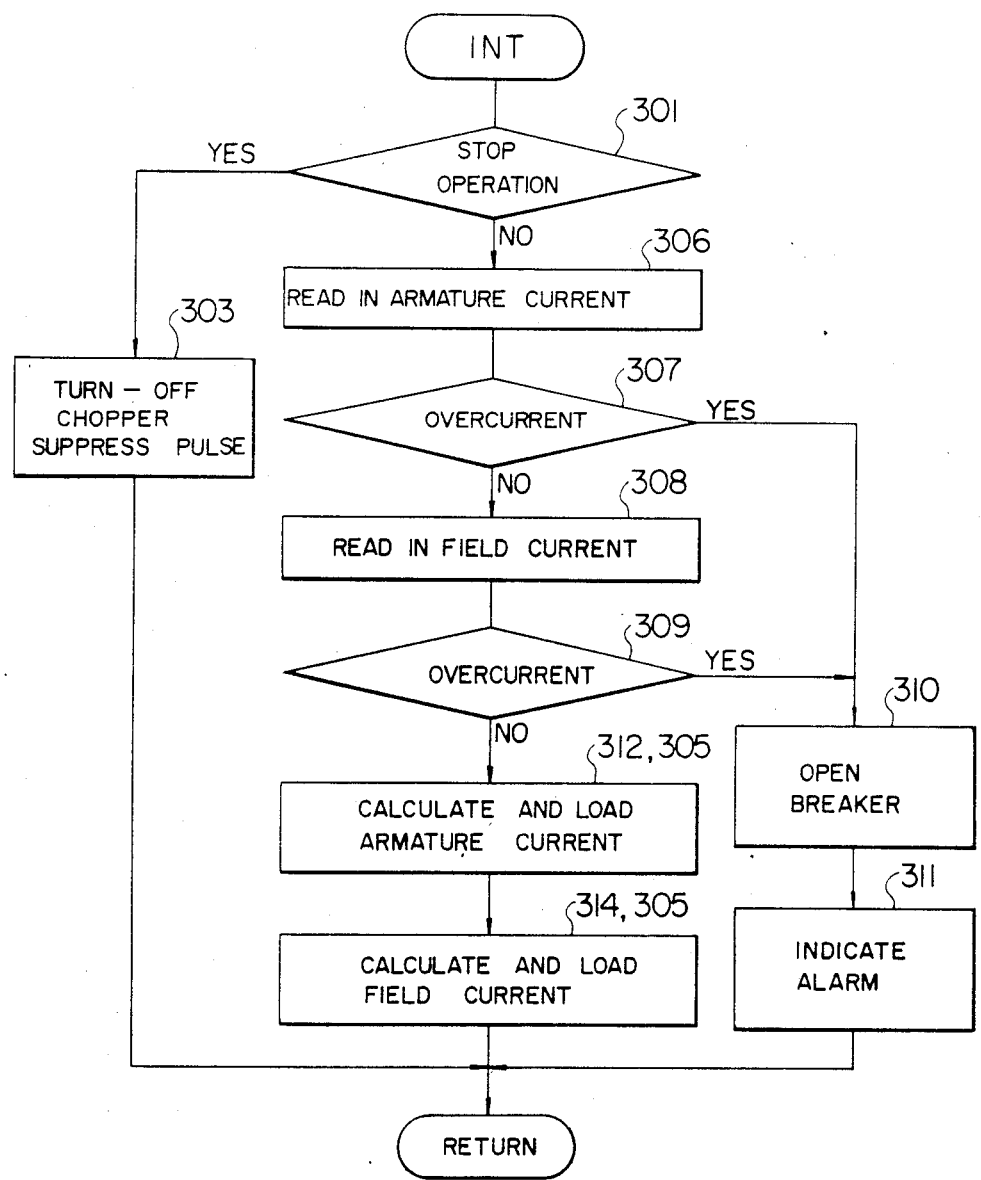
Figure 15:
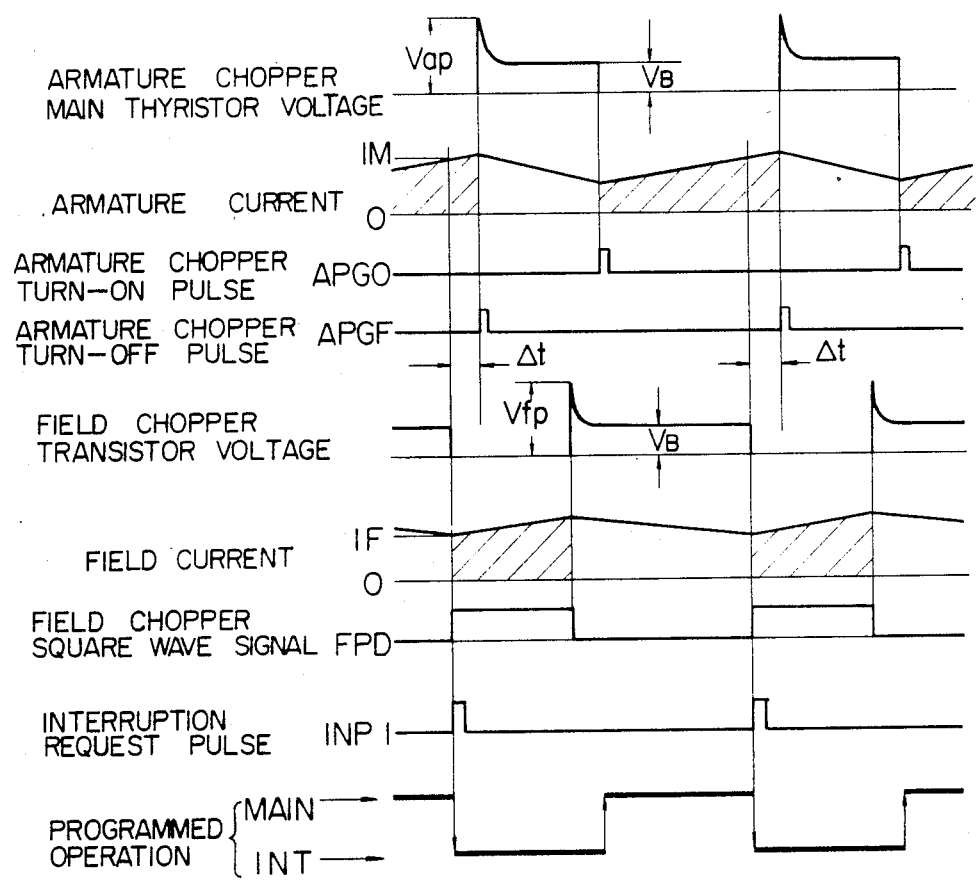

Those and other objects and advantages of the present invention will be apparent from the following detailed description when taken in conjunction with the accompanying drawings, in which:

FIG. 1 shows a configuration of one embodiment of an electric vehicle control unit in accordance with the present invention, FIG. 2 shows a configuration of one embodiment of an analog input control circuit shown in FIG. 1, FIG. 3 shows a circuit diagram of one embodiment of a digital input circuit shown in FIG. 1, FIG. 4 shows a circuit diagram of one embodiment of an interruption circuit shown in FIG. 1, FIG. 5 shows a circuit diagram of one embodiment of a duty factor control circuit and a pulse distribution circuit shown in FIG. 1, FIG. 6 shows operational waveforms of the circuit of FIG. 5, FIG. 7 shows a circuit diagram of one embodiment of a main circuit shown in FIG. 1, FIG. 8 shows a circuit diagram of one embodiment of a power digital output circuit shown in FIG. 1, FIG. 9 shows a circuit diagram of one embodiment of a velocity detection circuit shown in FIG. 1, FIG. 10 shows a circuit diagram of another embodiment of the duty factor control circuit, FIGS. 11a and 11b show operational waveforms of the circuit of FIG. 10, FIG. 12 shows a flow chart of one example of a main program illustrating the control operation for FIG. 1, FIG. 13 shows a flow chart of one example of an interruption program illustrating the control operation in the embodiment of FIG. 10, FIG. 14 shows a flow chart of one example of an interruption program illustrating the control operation in the embodiment of FIG. 5, and FIG. 15 shows a time chart of start sequence for the main program and the interruption program in the embodiment of FIG. 5.

Referring now to FIG. 1, a preferred embodiment of the present invention is explained. FIG. 1 shows a basic configuration of an electric vehicle control unit in accordance with one embodiment of the present invention. In FIG. 1, numeral 1 denotes a microcomputer which comprises a microprocessor 2, a random access memory 3, a read-only memory 4, an oscillation 5 and a bus line for data and control signals. Numeral 7 denotes an analog input circuit which receives a analog electrical signal ACA which is generated in proportion to the amount of step-in of an accelerator pedal 8, an analog electrical signal BRA which is generated in proportion to the amount of step-in of a brake pedal 9 and a plurality of analog signals provided from a main circuit 10 through a level converter circuit 11. One embodiment of the analog input circuit 7 and the level converter circuit 11 is shown in FIG. 2. The level converter 11 comprises six circuits for converting levels of six analog outputs from the main circuit 10. They are an amplifier 101 for amplifying an output IM of an armature current detector, an amplifier 102 for amplifying an output IF of a field current detector, an amplifier 103 for amplifying an output TB of a battery temperature sensor, an amplifier 104 for amplifying an output TM of an armature temperature sensor, an amplifier 105 for amplifying an output TT of a sensor which senses temperature of major thyristors of the main circuit 10, and a voltage dividing circuit for dividing down a battery voltage VB. The analog input circuit 7 comprises an analog multiplexor 107, an A/D converter 108, a register 109 and an analog input control circuit 110. When a control signal AIC is applied from the microprocessor 2 to the analog input circuit 7, the analog input control circuit 110 controls the multiplexor 107 such that an analog input specified by the control signal AIC is applied to the A/D converter 108. The A/D converter 108 is actuated to convert the specified analog signal to a digital signal, which is then retained in the register 109. Consequently, the microprocessor 2 reads in the specified analog signal by reading in the value of the digital signal AI.

Referring again to FIG. 1, numeral 12 denotes a digital input circuit which generates a one-bit accelerator switch signal ACD from the accelerator pedal 8 indicating the step-in of the accelerator pedal, a one-bit brake switch signal BRD from the brake pedal 9 indicating the step-in of the brake pedal and a one-bit signal KSD indicating the turn-on of a key switch 13, which signals are sent to the microcomputer 1. One embodiment of the digital input circuit 12 is shown in FIG. 3. It comprises primary delay filters including resistors R1, R3 and R5 connected to a power supply Vcc of the microcomputer 1 and capacitors C1, C2 and C3, respectively. When an accelerator switch SWA is open, an output DIA is at a level of the voltage Vcc, and when the accelerator switch SWA is closed the input DIA falls to zero volt. A filter comprising $R_2$ and $C_1$ serves to block noises. Similarly, when a brake switch SWB and a key switch SWK are actuated, the corresponding outputs DIB and DIK assume the voltage Vcc or zero volt depending on the status of the switches.

An interruption circuit 14 is constructed as shown in FIG. 4, in which four interruption request pulses INP-1–INP4 are received. When the pulse INP1 is issued, a flip-flop circuit 111 is set so that an output IND1 assumes a "1" level. The pulse INP1 is also applied to an OR circuit 115 which provides an interruption pulse INT to themicroprocessor 2. As a result, the microprocessor 2 reads in the content of IND and produces a reset pulse INRE to reset flip-flops 111–114. The microprocessor 2 examines the content of IND and if IND1 is "1" level it determines that an interruption has been requested at IND1 and executes the interruption processing. Similar operation takes place when the interruption request pulse INP2, INP3 or INP4 is issued.

Referring back to FIG. 1, numeral 15 denotes a duty factor control circuit for an armature chpper and a field chopper. A pair of square waves from an output terminal of the duty factor control circuit 15 are divided to a turn-on pulse and a turn-off pulse for the armature chopper by a pulse distribution circuit 16. Those pulses are amplified by an amplifier circuit 17 to provide chopper control signals for the main circuit 10. Detail of those circuits is shown in FIG. 5 and operational waveformes thereof are shown in FIG. 6.

Referring to FIG. 5, the duty factor control circuit 15 comprises a step-down counter 116a, a step-up counter 116b, registers 117 and 118, digital comparators 119 and 120 and a coincidence circuit 121. The stepdown counter 116a and the step-up counter 116b count the clock pulses CLO generated by the oscillator 5. When the count of the step-down counter 116a reaches zero, it is automatically reset to a full count. As a result, an output COUT1 of the step-down counter 116a produces a sawtooth wave as shown in FIG. 6. The register 117 retains a duty factor DUA of the armature chopper calculated by the microcomputer 1 in a well-known manner. The digital comparator 119 compare the count of the step-down counter 116a with the content of the register 117 and produces a square wave signal AP which assumes high level when the count of the step-down counter 116a is smaller than the content of the register 117. The signal AP is used to control the armature chopper. The coincidence circuit 121a compares the output COUT1 of the step-down counter 116a with a preset count COUTL of a count presetter 121b to detect the coincidence. The preset count COUTL is selected to a small count, as shown in FIG. 6, which is presettable by the presetter 121b. The coincidence circuit 121a produces the pulse INP1 of a fixed duration when the two input signals COUT1 and COUTL coincide. The pulse INP1 is the interruption request pulse applied to the interruption circuit 14 shown in FIG. 4 and it requests the interruption to the microprocessor 2. The step-up counter 116b is reset by the interruption request pulse INP1 so that it produces a square wave signal COUT2 as shown in FIG. 6. The register 118 retains a duty factor signal DUF of the field chopper calculated by the microcomputer 1 in a well-known manner. The digital comparator 120 compares the count COUT2 of the step-up counter 116b with the content of the register 118 and produces a square wave signal FP which assumes high level when the content of the register 118 is larger. The signal FP is used to control the field chopper. Accordingly, the square wave signal FP rises in synchronism with the interruption request signal INT1. The square wave signal AP for the armature chopper falls after the elapse of time period Δt from the occurence of the interruption request pulse INT1 which time period is sufficiently shorter than the period of the sawtooth wave signal. In the embodiment of FIG. 6, only the interruption request pulse INP1 is used and the interruption request pulses INP2–INP4 shown in FIG. 4 are not used, although they may be used in other applications. For example, since the response of the field current is slower than that of the armature current, only the armature current may be detected or commutation failure may also be detected in response to INP1 and the field current may be detected once in a plurality of chopper periods or in response to the asynchronously issued interruption request pulse INP2. A preferential interruption for emergency use may be effected in response to the interruption request pulse INP3. The interruption request pulse INP4 may be used for other purpose.

The pulse distribution circuit 16 shown in FIG. 1 is constructed as shown in FIG. 5. It comprises a monostable multivibrator circuit 122 which produces a pulse of a fixed duration in synchronism with the rise of the output square wave AP of the digital comparator 119, a monostable multivibrator circuit 123 which produces a pulse of a fixed duration in synchronism with the fall of the output square wave AP and AND gates 124 and 125. When it is desired to stop the feed of the current to the armature winding, a low level suppress signal SUP is applied to the AND gates 124 and 125 to suppress the feed of the control pulse to the armature chopper. When the suppress signal SUP is of "1" level, the outputs of the monostable multivibrators 122 and 123 are directly gated through the AND gates 124 and 125 which produce pulse signals APO and APF, respectively, as shown in FIG. 6. The outputs of the AND gates 124 and 125 are amplified by pulse amplifiers 126 and 127, respectively, to produce a turn-on gate pulse APGO and a turn-off gate pulse APGF, respectively, for a thyristor chopper for controlling the armature current as will be described later. The output square wave of the digital comparator 120 is amplified by an amplifier 128 to produce a base drive signal FPB for a transistor chopper for controlling the field current as will be described later.

The main circuit 10 is constructed as shown in FIG. 7. It is powered by a battery 130 and controls the armature current of a shunt motor 132 by a thyristor chopper 131 and controls a current in a field winding 134 of the shunt motor 132 by a transistor chopper 133. The thyristor chopper circuit 131 comprises a main thyristor 135, an auxiliary thyristor 136, a diode 137, a commutation capacitor 138 and a commutation reactor 139. An auxiliary charging diode 140 and a resistor 141 are connected to the commutation capacitor 138.

The operation of the armature chopper circuit 131 is explained below. Now, let us assume that both the thyristors 135 and 136 are off. During the off period, the capacitor 138 is charged up by the voltage of the battery 130. Under this condition, if the turn-on gate pulse APGO is applied to the gate of the main thyristor 135, it is rendered conductive to supply the current to the armature winding of the motor 132. When the turn-off gate pulse APGF is then applied to the gate of the auxiliary thyristor 136, it is rendered condutive to discharge the voltage stored in the capacitor 138. Since the discharging circuit forms a series resonance circuit by the capacitor 138 and the commutation reactor 139, a backward voltage is applied to the thyristors 135 and 136 when the direction of current flow is reversed and the thyristors are both turned off. Thereafter, the above operation is repeated. Consequently, the current is supplied to the armature during the high level period of the armature signal AP shown in FIG. 6. Numeral 142 denotes a flywheel diode for the shunt motor 132 and a D.C. reactor 144, and numeral 143 denotes a flywheel diode for the field diode. Numeral 145 denotes a power braker which is turned on by a manually operated lever mounted at a driver seat and turned off by a signal FET from the power digital output circuit 18. Numerals 146A and 146B denote contacts of a contactor 146. They take positions shown in FIG. 7 when a contactor control signal CON from the circuit 18 is at "0" level, and the contacts are switched by "1" level of the contactor control signal CON such that a terminal CA is connected to a terminal CAM and a terminal CB is connected to a terminal CBM. The contactor 146 selects power running and regenerative braking. The condition shown in FIG. 7 represents the regenerative mode in which when the thyristor chopper circuit 131 is turned on the induced voltage of the shunt motor 132 is shorted by the D.C. reactor 144 to turn off the thyristor chopper circuit 131 after a predetermined time interval, when the induced voltage across the shunt motor 132 and the D.C. reactor 144 is regenerated to the battery 130 through the flywheel diode 142. During this period, the field current is controlled by the chopper circuit 133 by the drive signal FPB. In this manner the regenerative braking is carried out. On the other hand, when the contactor control signal CON changes to "1" level to switch the contactor 146, the terminal CA is connected to the terminal CAM and the terminal CB is connected to the terminal CBM. Under this condition, when the thyristor chopper circuit 131 is turned on, the voltage of the battery 130 is applied to the shunt motor 132 so that the current in the shunt motor 132 increases. When the thyristor chopper circuit 131 is turned off, the current in the shunt motor 132 flows through the D.C. reactor 144 and the flywheel diode 142 to establish the power running mode. Accordingly, the armature current Ia increases during the on period of the armature chopper 131 and decreases during the off period as shown in FIG. 6.

Numerals 147 and 148 denote protection fuses, and numerals 149 and 150 denote an armature current sensing shunt resistor, respectively, voltages across which are read into the microcomputer 1 through the amplifiers 101 and 102, respectively, shown in FIG. 2. Numerals 151, 152 and 153 denote thermistors for sensing temperatures of the battery 130, the main thyristor 135 and the shunt motor 132, respectively, voltages across which are read into the microcomputer 1 through the amplifiers 103, 104 and 105, respectively, shown in FIG. 2.

Referring back to FIG. 1, numeral 18 denotes the power digital output circuit which produces the signal SUP for suppressing the gate pulse shown in FIG. 5 and the exciting signals CON and FET for the contactor 146 and the braker 145 shown in FIG. 7. Detail of the power digital output circuit 18 is shown in FIG. 8, in which numeral 181 denotes a register and numerals 183 and 184 denote exciting circuits. The register 181 receives digital pulse output signal DOP including the gate suppress signal SUP and the exciting signal for the braker 145 and the contactor signal CON from the microcomputer 1, retains them and produces "0" or "1" level outputs. The gate pulse suppress signal SUP is supplied to the AND gates 124 and 125 shown in FIG. 5, the exciting signal FET from the exciting circuit 182 is supplied to the relay switch 145 shown in FIG. 7, and the exciting signal CON from the exciting circuit 183 is supplied to the power running/regenerative braking mode selecting relay switch 146.

Numeral 19 denotes a velocity detection circuit which digitally detects the velocity based on an output pulse train PLP from a pulse generator 20 which generates pulses in accordance with rotational position of the shunt motor 132 having a frequency proportional to the rotation speed of the shunt motor 132. The detection output of the velocity detection circuit 19 is read into the microcomputer 1.

On embodiment of the velocity detection circuit 19 is shown in FIG. 9. It comprises a counter 155 for generating pulses at a time interval which is used as a reference to measure the velocity, a monostable multivibrator 156 for generating a pulse of a fixed duration in synchronism with a fall of an overflow pulse from the counter 155, a counter 157 for counting the output pulses PLP from the pulse generator 20 and a register 158 for retaining the outputs of the counter 157 at a predetermined time interval. Since the counter 157 is reset at the predetermined time interval by the output pulses from the monostable multivibrator 156, the velocity is detected by the number of pulses received during the predetermined time interval, that is, by the content of the counter 157. The content of the counter 157 is loaded to the register 158 by the overflow pulse from the counter 155 immediately before a reset pulse is applied. The microcomputer 1 reads in the content V1 of the register 158 to detect the velocity. The clock pulses to the counter 155 are derived from the reference pulses CLO from the oscillator 5 shown in FIG. 1.

Referring again to FIG. 1, numeral 21 denotes a digital output circuit for turning on a lamp on a display panel 22 at the driver seat.

The duty factor control circuit 15 shown in FIG. 5 has a constant chopper period as is apparent from the description made in conjunction with FIG. 6. FIG. 10 shows another embodiment of the duty factor control circuit 15 in which the chopper period is changed in accordance with the signal from the microcomputer 1. It comprises counters 400 and 401, registers 403, 404 and 405 and digital comparators 406, 407 and 408. The counter 400 counts the clock pulses CLO generated by the oscillator 5. As a result, the output COU1 of the counter 400 increases as shown in FIG. 11a and it is compared with the content DCT of the register 403 by the digital comparator 406. The content DCT is calculated by the microcomputer 1 by a well-known method based on the step-in amount ACA of the accelerator pedal and the armature current IM. The digital comparator 406 produces a pulse CL1 when DCT and COU1 are equal. The pulse CL1 is used as a reset pulse for the counter 406 and a clock pulse for a counter 401. The pulse period $\Delta T$ of CL1 is represented by:

$$\Delta T = \frac{N_c}{f} \quad (1)$$

where f(Hz) is the frequency of the clock pulses CLO and $N_c$ is the content of DCT. It is seen from the equation (1) that the pulse period $\Delta T$ of CL1 is proportional to the content $N_c$ of DCT. Thus, the frequency of CL1 is changed by the content $N_c$.

The pulses thus produced are used as clock pulses for the N-bit counter 401. Thus, the counter 401 is reset at every $2^N$ pulse count to produce an output COU2 as shown in FIG. 11b. The overflow pulse of the counter 401 is used as the interruption request pulse INP1 shown in FIG. 4 which requests the interruption to the microprocessor 2. On the other hand, the output COU2 of the counter 401 is applied to the digital comparators 407 and 408 where they are compared with the contents $N_a$ and $N_f$ of the registers 404 and 405, respectively. When the content $N_a$ of the register 404 is larger than the output COU2, a "1" level signal AP is produced, and when the content $N_f$ of the register 405 is larger than the output COU2, a "1" level signal FP is produced. Period $T_c$ and duty factors $\alpha_a$ and $\alpha_f$ (i.e. "1" level period/$T_c$) of the square wave signals AP and FP are represented by:

$$T_c = \Delta T \cdot 2^N = \frac{N_c}{f} \cdot 2^N \quad (2)$$

$$\alpha_a = \frac{N_a \cdot \Delta T}{T_c} = N_a/2^N \quad (3)$$

$$\alpha_f = \frac{N_f \cdot \Delta T}{T_c} = N_f/2^N \quad (4)$$

Thus, the chopper period $T_c$ is controlled by the content $N_c$ of the register 403, that is, the content DCT, the duty factor $\alpha_a$ of the armature chopper is controlled by the content $N_a$ of the register 404, that is, the content of DUA, and the duty factor $\alpha_f$ of the field chopper is controlled by the content of the register 405, that is, the content of DUF.

The control unit shown in FIG. 1 is operated in accordance with the sequential processing of programs stored in the read-only memory 4.

The programs stored in the read-only memory 4 of FIG. 1 are classified into two major categories. First group of programs is a main program which is normally executed. The content of processing is shown in FIG. 12. Second group of programs is an interruption program which is started in response to the interruption request pulse INT from the interruption circuit 14. The content of processing is shown in FIG. 13. FIGS. 12 and 13 will now be explained in connection with FIG. 1.

When the microcomputer 1 is powered on, a step 200 in FIG. 12 is carried out to initialize the registers and the RAM 3 shown in FIG. 1. Then, the key switch signal KSD, the accelerator switch signal ACD and the brake switch signal BRD are read in through the digital input circuit 12. That is, a step 201 is carried out to examine the output ACD of the key switch. If the key switch is off, a step 202 is carried out to select a stop operation. The selection of the stop operation renders the output SUP of the power digital output circuit 18 to be low level which in turn causes the AND gates 124 and 125 of the pulse distribution circuit 16 shown in FIGS. 5 and 10 to be nonconductive. After the stop operation has been selected, the decision at the step 201 is repeated. When the key switch is on, a step 203 is carried out to check the status of the accelerator switch of the accelerator pedal 8. If the accelerator pedal is stepped in, the power running mode is selected in a step 204 and the analog output ACA of the accelerator pedal 8 is read in through the analog input circuit 7. As the power running mode is selected, the output CON of the power digital output circuit 18 assumes the high level to switch the relay switch 146 of the main circuit 10 to the power running mode position. On the other hand, if the accelerator switch is off, the status BRD of the brake switch of the brake pedal 9 is examined in a step 205. If the brake switch is off, the stop operation is selected and the process goes back to the step 201. If the brake switch is on, the regenerative braking mode is selected in a step 206 and the analog output BRA of th brake pedal 9 is read in through the analog input circuit 7. The regenerative braking mode is selected by holding a low level signal at a contact signal CON position of the register 181 of the power digital output circuit 18. As a result, the relay switch 146 of the main circuit 10 is switched to the regenerative braking mode position.

In a step 207, the temperatures TM, TT and TB of the motor, the main thyristor and the battery, respectively, are read in through the level converter 11 and the analog input circuit 7 and they are examined in a step 208 if they exceed preset allowable temperatures stored in the RAM 3. If any one of the temperatures exceeds the allowable temperature, an abnormal condition is determined and the process goes to a step 209. In the step 209, a relatively low duty factor prestored in the RAM 3 is loaded to the register 117 of the duty factor control circuit 15 to reduce the armature current so that protection function is carried out. In a step 210, an alarm by a lamp is indicated on the panel 22 through the digital output circuit 21.

On the other hand, if the decision at the step 208 is normal, the process goes to a step 211 where the battery voltage VB is read in through the level converter 11 and the analog input circuit 7. If the battery voltage VB is lower than a battery voltage necessary to continuously operate the electric vehicle which voltage is prestored in the RAM 3, an abnormal condition is determined in a step 212 and the protection function and the alarm indication of the steps 209 and 210 are carried out as is the previous case. If the decision at the step 212 is normal, the process goes to a step 213 where the rotation speed VI of the motor is read in through the velocity detection circuit 19. If the rotation speed VI is higher than an allowable rotation speed prestored in the RAM 3, an overrotation is determined in a step 214 and the protection function and the alarm indication are carried out as is the previous case. If non-overrotation is determined, the process goes to steps 215 and 216.

In the steps 215 and 216, an armature current command IMC and a field current command IFC are calculated based on the step-in amount of the accelerator pedal and the step-in amount of the brake pedal read in the steps 204 and 206 and the rotation speed of the motor detected in the step 213, and those commands are stored in the RAM 3. Those current commands correspond to the magnitudes of the armature current and the field current and they are retrieved from a map prestored in the ROM 4 in accordance with the step-in amounts and the rotation speed. For example, in the power running mode, the armature and field current commands are increased or decreased in accordance with the step-in amount of the accelerator pedal. In the regenerative braking mode, the armature and field current commands are varied such that a braking force is varied depending on the step-in amount of the brake pedal. Alternatively, a current command for varying the driving force or the braking force in accordance with the rotation speed of the motor may be calculated. Such a control method has been proposed, for example, by IECI, Mar. 21–23, 1977, pages 144–151.

When the step 216 has been completed, the process goes back to the step 201 and the similar process is repeated.

During the execution of the main program, if the interruption request pulse INP 1 shown in FIG. 5 or 10 is issued, the interruption program shown in FIG. 13 is executed. FIG. 13 will now be explained in connection with the embodiment shown in FIG. 10. In the interruption program, it is first determined if the stop operation of the step 202 in FIG. 12 has been selected. If it has been selected, the process goes to a step 302 where the constant value $N_c$ which defines a sufficiently shorter chopper period $T_c$ than that in a normal operating condition is loaded to the register 403 of FIG. 10 as the signal DCT. The short chopper period $T_c$ is established for the deactuated chopper because the overflow pulse of the counter 401 is used as the interruption request pulse INP1 and hence a shorter chopper period (e.g. 1 ms) than a normal chopper period (e.g. several milliseconds to several tens milliseconds) can be selected. As a result, a delay included in the decision when the chopper operation is resumed from its stopped condition is reduced and a faster switching operation is attained. After the step 302, a step 303 is carried out to cause the signal SUP to assume "0" level through the power digital output circuit 18 so that the AND gates 124 and 125 are rendered non-conductive to stop to feed the pulse to the armature chopper.

If the stop operation has not been selected, the process goes to steps 304 and 305 in which digital values $N_c$, $N_a$ and $N_f$ corresponding to the choppers period $T_c$, the armature chopper duty factor $\alpha_a$ and the field chopper duty factor $\alpha_f$, respectively, calculated in the previous interruption processing are loaded to the registers 403, 404 and 405, respectively, of FIG. 10. Those digital values $N_a$, $N_c$ and $N_f$ are calculated in steps 312, 313 and 314, respectively, to be described later.

A step 306 is then carried out in which the magnitude IM of the analog current is read into the microcomputer 1 through the analog input circuit 7. In a step 307, if the value is larger than the allowable value prestored in the RAM 3, an abnormal condition is determined and the process goes to steps 310 and 311 in which the breaker 145 in FIG. 7 is opened through the power digital output circuit 18 to stop to supply the voltage to the shunt motor 132 and an alarm is indicated on the panel 21 through the digital output circuit 20. This completes the interruption processing program and the process now moves to the main program. If non-overcurrent is determined in the step 307, the process goes to a process 308 in which the magnitude IF of the field current is read into the microcomputer 1 through the analog input circuit 7. In a step 309, if the value is larger than the allowable value prestored in the RAM 3, an abnormal condition is determined and the process goes to the steps 310 and 311 to open the breaker 145 and indicate the alarm to complete the interruption processing program. Then the process returns to the main program. If an overcurrent is not determined in a step 309, the process goes to a step 312 in which a control operation is carried out to bring an actual current value to the current command based on the armature current command IMC calculated in the step 215 of the main program and the detected armature current IM. In the step 312, a difference between the armature current command IMC and the armature current IM is calculated as follows:

$$\Delta IM = IMC - IM \tag{5}$$

Then, compensation operations for the control system, that is, proportional compensation and integration compensation are carried out in accordance with the following formula to determine the armature chopper duty factor $\alpha_a$:

$$\alpha_a K_{pm} \cdot \Delta IM + K_{Im} \int \Delta IM \cdot dt \tag{6}$$

where $K_{pm}$ is a proportional gain and $K_{Im}$ is an integration gain.

In a step 313, the chopper period $T_c$ is calculated based on the armature chopper duty factor $\alpha_a$. It is known that when the motor is driven by the chopper, a current pulsation factor $\mu I$ is independent from the duty factor $\alpha_a$ of the chopper frequency f is controlled by a square function of the duty factor $\alpha_a$. The current pulsation factor $\mu I$ is defined by a mean value of the armature current as follows:

$$\mu I = \frac{i_{max} - i_{min}}{IM} = \frac{VB \cdot \alpha_a(1 - \alpha_a)}{L \cdot IM \cdot f} \tag{7}$$

where L is an inductance of the armature and VB is the battery voltage.

The chopper frequency f has a relation with the chopper period $T_c$ and the duty factor $\alpha_a$ as shown by the formula:

$$f = \frac{1}{T_c} = K_I \cdot \alpha_a(1 - \alpha_a) \quad (8)$$

By placing the formula (8) to the formula (7), $$\mu I = \frac{VB}{L \cdot IM \cdot K_I} \quad (9)$$

As seen from the formula (9), in order to maintain the pulsation of the armature current at a constant value at every operation point, $K_I$ in the formula (9) or $T_c \cdot \alpha_a(1 - \alpha_a)$ in the formula (8) is to be kept constant. It is thus possible to maintain the pulsation of the armature current at the constant value by determining $T_c$ in accordance with $\alpha_a$ in the formula (8).

In a step 314, a control operation is carried out to bring the actual current to the current command based on the field current command IFC calculated in the step 216 of the main program and the detected field current IF to determine the field chopper duty factor $\alpha_f$.

Finally, in a step 315, a time is calculated. In this step, the digital values $N_c$ for determining the chopper period $T_c$ are summed in accordance with the following formula:

$$N = \sum_{i=k}^{k+j} N_c(i) \quad (10)$$

where $N_c(i)$ is a digital value for determining the chopper period calculated in the i-th interruption processing and k indicates the number of times of the interruption processing in which time summation was reset.

From the N of the formula (10), it is determined how long time has elapsed since the k-th reset. Since the formula (10) correctly reflects the change in the period whatever the chopper period changes from time to time, the time can be calculated with the accuracy of the chopper period. By using the value N, a timer operation when the power running/regenerative braking mode is selected can be attained without additional hardware timer. By the timer operation, clocking can be started from the instant of the command to the relay contactor 146 and the detection of the armature current IM is suppressed until the time period required to complete the switching operation of the contactor has been counted so that erroneous control due to erroneous detection of the current is avoided.

The interruption processing program of FIG. 13 is completed when the step 315 is completed and the process returns to the normal main program.

The interruption processing program for the embodiment shown in FIG. 5 is carried out in accordance with FIG. 14, in which the steps are designated to correspond to the steps shown in FIG. 13. A start sequence for the two programs in the embodiment of FIG. 5 is shown in FIG. 15 with respect to the operations of the armature chopper and the field chopper. When the interruption request pulse INP 1 is issued, the process moves from the main program to the interruption processing program. At the same time, the square wave signal FPD of the field chopper is produced so that the field chopper is turned on the feed the field current IF. On the other hand, the armature chopper is turned off by the turn-off pulse APGE which is produced $\Delta t$ time after the interruption request pulse INP1. The current is read in at a timing which is synchronous with the interruption request pulse INP 1. Thus, the field current IF which appears immediately after the turn-on of the field chopper and the armature current IM which appears immediately before the turn-off of the armature chopper are read into the computer. The interruption processing program is executed in accordance with the flow shown in FIG. 14, and when the interruption processing program is completed in, for example, 20-30 milliseconds, the process returns to the main program.

By controlling the motor by the construction thus described, the control performance hardly varies by the changes in temperature and environment because the microprocessor is used and hence a highly reliable and small apparatus is attained. By generating the interruption request pulse at the timing shown in FIG. 15, the following advantages are offered. Firstly, as shown in FIG. 15, since the armature chopper and the field chopper are synchronously operated so that the field chopper is turned on immediately before the turn-off of the armature chopper, a jump voltage $V_{ap}$ of the main thyristor due to the effect of the inductance of the circuit when the armature chopper is turned off and a jump voltage $V_{fp}$ of the transistor produced when the field chopper is turned off are not simultaneously produced. In the conventional asynchronous armature and field choppers and synchronous turn-on choppers, the jump voltages may be superimposed because the turn-off of the choppers may occur simultaneously. Accordingly, the elements of the conventional choppers needed high breakdown voltage to withstand the superimposed jump voltages.

In the present invention, since the armature chopper is turned off after the turn-on of the field chopper, the breakdown voltage of the elements need only be high enough to withstand the jump voltage at the turn-off time of the choppers. The field chopper usually uses transistors because of the small capacity required. Thus, the use of lower breakdown voltage elements significantly contributes to the simplification of the surge absorption circuit and the cost reduction of the elements.

Secondly, as seen from the operational waveforms of the armature current and the field current, the resultant current ripple is reduced and the torque ripple is also reduced because the phases of the armature current and the field current are staggered such that the field current increases (during the on period of the field chopper) while the armature current decreases (during the off period of the armature chopper).

Thirdly, since the operation timings for the armature chopper and the field chopper can be associated with each other and set to any desired timing, a current value at a desired timing in one chopper cycle can be read in.

Fourthly, the armature current can be detected not only directly from the armature current but also by detecting a signal across the shunt resistor 149 which detects the battery current supplied to the armature as shown in FIG. 7. When the shunt is inserted at a position shown by 149' in FIG. 7, the armature current can be detected even after the turn-off of the chopper because the armature current flows through the diode 142. However, it is necessary to connect one terminal of the shunt 149' to the ground terminal of the battery. When the shunt is inserted at the position 149, no additional ground line is required.

Fifthly, since the calculation of the duty factor for the next chopper period is started from the instant immediately before the turn-off of the chopper based on the instantaneous current value appearing immediately after the turn-on of the chopper, a high response control to the changes in the command and load is attained. Furthermore, since the process is carried out in every chopper cycle for the fast response current control, the response time is further improved. On the other hand, since the response after the accelerator pedal has been stepped-in may be relatively slow in the electric vehicle, the calculation of the current command is carried out once for every several chopper cycles in the main program. As a result, the interruption processing program may be executed less frequently and the processing time is shortened. Consequently, a relatively slow speed microcomputer may be used for the process.

While the embodiment showed the method of turning on the field chopper immediately before the turn-off of the armature chopper, the sequence may be reversed.

While the chopper period is constant in the illustrated embodiment, a variable chopper period may be used.

In the series motor control, when a bypass contactor turn-on control is effected to short the chopper in order to attain a maximum output power, the chopper is stopped when the contactor is turned on. In this case, the interruption request may be issued in synchronism with a constant period signal from a chopper controlling oscillator.

As described hereinabove, in accordance with the present invention, the overvoltage of the choppers is suppressed when the armature chopper and the field chopper are used.

In the embodiment shown in FIG. 10, the process by the microcomputer is simplified because the armature chopper and the field chopper are synchronously operated and the interruption processing is synchronized with the armature chopper. Furthermore, even if the armature chopper period varies, the duty factor of the field chopper can be dependently controlled by the use of the duty factor control circuit of FIG. 10. In the interruption processing program shown in FIG. 13, since the chopper period during the deactivation of the chopper is independently set to the smaller period than normal period, the interruption request pulse INP1 is issued more frequently than normal and the time delay in switching from the deactivation to the activation of the chopper is reduced. By the use of the timer operated by the chopper period $T_c$, no additional hardware timer is needed and the hardware construction is simplified. Only the addition of chopper period is required for the software.

As described hereinabove, in accordance with the present invention, the process by the microcomputer is simplified because the armature chopper and the field chopper are synchronously operated and the interruption request pulse is issued in synchronism with the armature chopper.

What is claimed is:

1. A chopper controller for a D.C. motor comprising:
    (a) a D.C. power supply;
    (b) an armature chopper for chopping a current supplied to an armature winding of said D.C. motor from said D.C. power supply to control the current flowing in said armature winding;
    (c) a field chopper for chopping a current supplied to a field winding of said D.C. motor from said D.C. power supply to control the current flowing in said field winding;
    (d) a command signal generator for commanding a magnitude of at least one of a driving force and a rotation speed of said D.C. motor;
    (e) detection means for detecting the armature current and the field current flowing in said armature winding and said field winding, respectively, of said D.C. motor;
    (f) computing means including command calculating means for calculating an armature current command and a field current command based on a command signal associated with the command from said command signal generator, said computing means further including means for calculating a duty factor of said armature chopper and a duty factor of said field chopper based on said armature current command and said field current command from said command calculating means and an armature current and the field current detected by said detection means;
    (g) an armature chopper control circuit for producing an armature chopper control signal to control turn-on and turn-off of said armature chopper in accordance with the armature duty factor computed by said computing means, said armature chopper control signal being supplied to said armature chopper;
    (h) a field chopper control circuit for producing a field chopper control signal to control turn-on and turn-off of said field chopper in accordance with the field duty factor computed by said computing means, said field chopper control signal being supplied to said field chopper;
    (i) an interruption request pulse signal generating circuit for generating an interruption request pulse signal in synchronism with one of said armature chopper control signal and said field chopper control signal; and
    (j) means for operating said command calculating means in a normal operation state and responsive to said interruption request pulse signal for interrupting said command calculating means and operating said duty factor calculating means during an interrupt operation state initiated by said interruption request pulse signal.

2. A chopper controller for a D.C. motor according to claim 1 wherein said armature chopper control signal from said armature chopper control circuit and said field chopper control signal from said field chopper control circuit are produced synchronously with each other.

3. A chopper controller for a D.C. motor according to claim 1 wherein said armature chopper control signal from said armature chopper control circuit and said field chopper control signal from said field chopper control circuit are produced with a predetermined phase difference therebetween.

4. A chopper controller for a D.C. motor according to claim 3 wherein said armature chopper control circuit is adapted to turn off said armature chopper a predetermined time period after said field chopper has been turned off, said predetermined time period being sufficiently shorter than a chopper period and long enough to allow said computing means to read in at least said armature current detected by said detection means.

5. A chopper controller for a D.C motor according to claim 4 wherein said interruption pulse signal generating circuit generates said interruption pulse signal in synchronism with the turn-on of said field chopper, said computing means being responsive to said interruption pulse signal for reading in said armature current and said field current detected by said detection means.

6. A chopper controller for a D.C. motor according to claim 1 wherein said computing means includes a chopper period control circuit for calculating chopper periods of said armature chopper and said field chopper based on said command signal and at least one of said armature current and said field current and controlling periods of said armature chopper control signal from said armature chopper control circuit and said field chopper control signal from said field chopper control circuit.

7. A chopper controller for a D.C. motor according to claim 6 wherein said computing means computes said chopper period $T_c$ such that the value $T_c \cdot \alpha_a (1 - \alpha_a)$ is kept substantially constant, where $\alpha_a$ is said armature duty factor.

8. A chopper controller for a D.C. motor according to claim 1 wherein said armature chopper control circuit and said field chopper control circuit produce said armature chopper control signal and said field chopper control signal, respectively, of predetermined periods, respectively, and further comprising timer means for measuring time by summing said chopper period each time said interruption request pulse is issued.

9. A chopper controller for a D.C. motor according to claim 6 further comprising timer means for measuring time by summing said chopper period computed by said computing means each time said interruption request pulse signal is issued.

10. A chopper controller for a D.C. motor according to claim 1 further comprising chopper control suppression means for suppressing the feed of said chopper control signals to at least one of said armature chopper and said field chopper.

11. A chopper controller for a D.C. motor according to claim 10 wherein said chopper control suppression means is operative to keep said armature chopper control circuit and said field chopper control circuit activated during the suppression of the chopper control 12. A chopper controller for a D.C. motor according to claim 6 further comprising chopper control suppression means for suppressing the feed of said chopper control signals to at least one of said armature chopper and said field chopper.

13. A chopper controller for a D.C. motor according to claim 12 wherein said chopper control suppression means is operative to shorten said chopper period than a normal operation chopper period during the suppression of the chopper control.

14. A chopper controller for a D.C. motor according to claim 1 further comprising protection means for detecting a temperature of at least one of said D.C. motor, said armature chopper, said field chopper and said D.C. power supply to control said armature chopper control circuit to reduce the current in said armature winding when the detected temperature exceeds a predetermined temperature.

15. A chopper controller for a D.C. motor according to claim 1 further comprising protection means for controlling said armature chopper control circuit to reduce the current in said armature winding when the voltage of said D.C. power supply exceeds a predetermined level.

16. A chopper controller for a D.C. motor according to claim 1 further comprising protection means for detecting a rotation speed of said D.C. motor to control said armature chopper control circuit to reduce the current in said armature winding when the detected rotation speed exceeds a predetermined speed.

17. A chopper controller for a D.C. motor according to claim 1 further comprising protection means for detecting at least one of said armature current and said field current to block the circuit for feeding the current to said D.C. motor to said D.C. power supply when the detected current exceeds a predetermined level.

18. A chopper controller for a D.C. motor according to claim 14 further comprising means for indicating alarm when said protection means is actuated.

19. A chopper controller for a D.C. motor according to claim 15, further comprising means for indicating alarm when said protection means is actuated.

20. A chopper controller for a D.C. motor according to claim 16, further comprising means for indicating alarm when said protection means is actuated.

21. A chopper controller for a D.C. motor according to claim 17, further comprising means for indicating alarm when said protection means is actuated.

22. A chopper controller for a D.C. motor according to claim 1, wherein said armature chopper control signal from said armature chopper circuit and said field chopper control signal from said field chopper control circuit are produced with a predetermined phase difference therebetween to prevent the simultaneous turn-off of said armature chopper and said field chopper.

* * * * *